A. C. NILES.
SHUTTER FOR MOVING PICTURE MACHINES.
APPLICATION FILED JAN. 6, 1912.

1,067,750.

Patented July 15, 1913.

Witnesses
E. M. Fahnestock
Chas. C. Foster

Inventor
Allen C. Niles
by John W. Prehli
Attorney

UNITED STATES PATENT OFFICE.

ALLEN C. NILES, OF BELLEVUE, KENTUCKY, ASSIGNOR OF ONE-THIRD TO WALTER O. FORSTER AND ONE-THIRD TO CHARLES C. FORSTER, BOTH OF DAYTON, KENTUCKY.

SHUTTER FOR MOVING-PICTURE MACHINES.

1,067,750.   Specification of Letters Patent.   Patented July 15, 1913.

Application filed January 6, 1912. Serial No. 669,905.

*To all whom it may concern:*

Be it known that I, ALLEN C. NILES, a citizen of the United States, residing at the city of Bellevue, in the county of Campbell and State of Kentucky, have invented certain new and useful Improvements in Shutters for Moving-Picture Machines, of which the following is a specification.

The object of my invention is to produce a cheap, simple and efficient shutter for moving picture machines, which will cut off the light abruptly and allow the light to come on gradually, thus enabling me to throw a steady picture upon the screen, and prevent flickering and agitation of the pictures upon the screen. Its various features and advantages will readily become apparent from a perusal of the following specification and claims.

Figure 1:
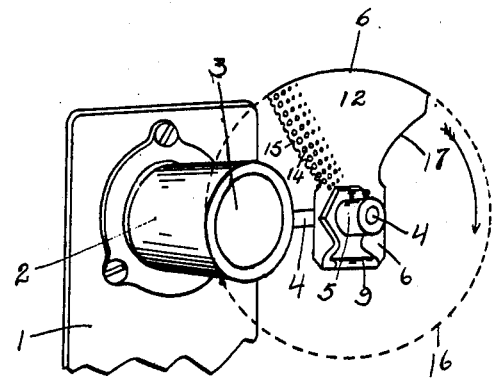
Figure 2:
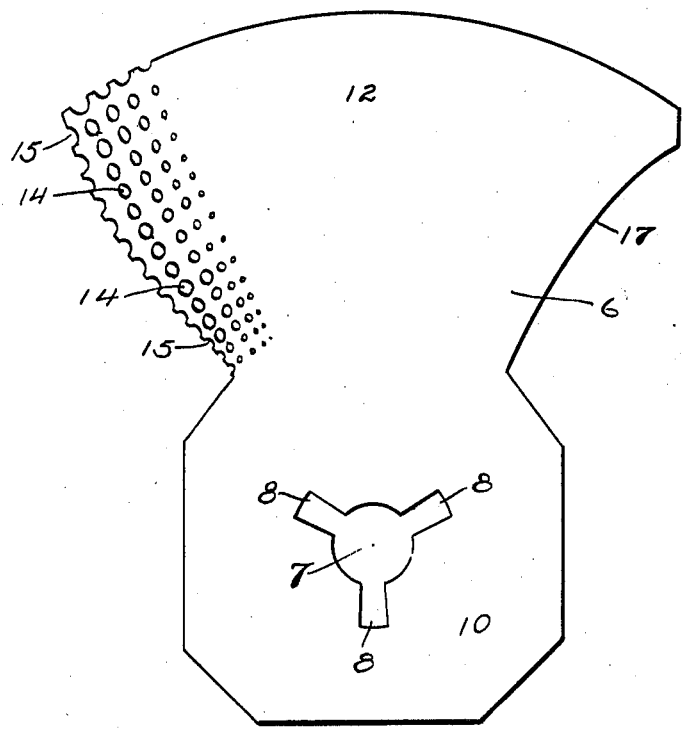

In the accompanying drawing forming part of this specification, Figure 1 is a perspective view of my invention, and Fig. 2 a plan view thereof.

The frame 1, which is a part of the machine, (the machine itself not being shown) has secured to it the projected lens frame 2, carrying the lens 3. This lens and frame may be of any approved form. From the machine is extended a revolving shaft 4, operated and connected in any suitable manner. On the shaft 4, I connect in any suitable manner a clamp 5, in which is firmly gripped the shutter 6; the shaft 4 extending through the shutter 6 at 7, the slots or recesses 8 enabling the clamp to more firmly hold the shutter in normal position. This clamp mechanism may be of any shape, contour or construction, in fact, the shutter 6 may be rigidly held on the shaft 4 in any desired manner. A counterbalance weight 9 is used to balance the shutter 6. The shutter 6 has a base 10 and a head 12, preferably shaped as shown, but I may use any form of shutter desired.

On one side or edge of the head 12 of the shutter 6, I provide holes or perforations 14 and form recesses 15 on the edge of the shutter as shown. These perforations are formed in rows or lines, but may be in irregular rows if desired. Usually I make them larger near the edge and diminish them in size as they recede. These perforations may be of any suitable size, and diminish until they become very small in size.

The shutter in revolving describes the circle or path described by the dotted lines 16, and moves in the direction shown by the arrow in Fig. 1. These holes may be round, oblong or of any other configuration.

The picture is thrown upon the screen through the lens 3 and is upon the screen about three-fourths of the time required for the revolution of the shutter 6, the other fourth of the time, the space between the pictures is passing through the machine, and at this time the shutter is passing over the face of the lens 3, shutting off the light, and as the plain or solid side 17 of the shutter 6 first reaches the lens, the light is cut off abruptly and as the shutter passes on in its path, the perforated side reaches and leaves the front of the lens, allowing the light to come on gradually and not suddenly, the light passing through the perforations in the shutter; thus giving more light and preventing the flickering and jerking motion of the picture on the screen. In this operation the machine can be run with less electric current as I increase the light and the picture is transferred to the screen in a natural, steady and uniform manner.

The main feature of my invention consists in providing a shutter which abruptly cuts off the light and turns it on gradually and not suddenly.

What I claim as new and of my invention, and desire to secure by Letters Patent is:

1. In a moving picture machine, a revolving shutter provided with a plain uninterrupted side edge, and a perforated side, the edge of the perforated side being recessed as set forth.

2. In a moving picture machine, a revolving shutter, having a plain uninterrupted edge, and a recessed edge, the recessed side having perforations largest at the outside and diminishing in size toward the center of the shutter, as set forth.

3. In a moving picture machine, a revolving shutter—said shutter made plain and imperforated in one side and at its other side provided with perforations.

ALLEN C. NILES.

Witnesses:
 WM. HASSENPFLUG,
 CHAS. C. FORSTER.